(12) United States Patent
Yamanaka et al.

(10) Patent No.: US 11,476,567 B2
(45) Date of Patent: Oct. 18, 2022

(54) DECORATIVE MEMBER

(71) Applicants: Ikuyo Co., Ltd., Kanagawa (JP); O-WELL CORPORATION, Osaka (JP)

(72) Inventors: Masahiko Yamanaka, Kanagawa (JP); Atsushi Nakamura, Kanagawa (JP); Tomohiro Kawamura, Kanagawa (JP)

(73) Assignees: IKUYO CO., LTD., Kanagawa (JP); O-WELL CORPORATION, Osaka (JP)

( * ) Notice: Subject to any disclaimer, the term of this patent is extended or adjusted under 35 U.S.C. 154(b) by 0 days.

(21) Appl. No.: 17/056,372

(22) PCT Filed: May 16, 2019

(86) PCT No.: PCT/JP2019/019430
§ 371 (c)(1),
(2) Date: Nov. 17, 2020

(87) PCT Pub. No.: WO2019/221213
PCT Pub. Date: Nov. 21, 2019

(65) Prior Publication Data
US 2021/0194119 A1    Jun. 24, 2021

(30) Foreign Application Priority Data

May 17, 2018  (JP) .............................. JP2018-095334

(51) Int. Cl.
*H01Q 1/42* (2006.01)
*H01Q 1/32* (2006.01)
(Continued)

(52) U.S. Cl.
CPC ............ *H01Q 1/42* (2013.01); *B60R 13/005* (2013.01); *C08J 7/0423* (2020.01); *G01S 7/03* (2013.01);
(Continued)

(58) Field of Classification Search
CPC ...... H01Q 1/32; H01Q 1/3208; H01Q 1/3233; H01Q 1/42
See application file for complete search history.

(56) References Cited

U.S. PATENT DOCUMENTS 7,256,746 B2 * 8/2007 Kamiya .................... G01S 7/03
343/872
7,619,575 B2 * 11/2009 Kamiya ................. H01Q 1/422
343/711
(Continued)

FOREIGN PATENT DOCUMENTS

JP    200439379 A    2/2004
JP    2008105207 A   5/2008
(Continued)

OTHER PUBLICATIONS

International Search Report for related JP. App. No. PCT/JP2019/019430 dated Aug. 6, 2019. English translation provided; 5 pages.

*Primary Examiner* — Jason Crawford
(74) *Attorney, Agent, or Firm* — Procopio, Cory, Hargreaves & Savitch LLP

(57) ABSTRACT

To provide a decorative member that has a small transmission loss of a millimeter wave and excellent metallic luster. The decorative member includes a base material made of a synthetic resin and a film body that made of an agglomeration of inorganic fine particles having at least a metal surface. An attenuation rate when a millimeter wave having a frequency of 18 to 300 GHz transmits is 0.001 to 2 dB, and an L* value (brightness) is 45 to 95.

11 Claims, 1 Drawing Sheet

(51) Int. Cl.
*B60R 13/00* (2006.01)
*G01S 7/03* (2006.01)
*C08J 7/04* (2020.01)
*B32B 7/025* (2019.01)

(52) U.S. Cl.
CPC ............ *H01Q 1/3233* (2013.01); *B32B 7/025* (2019.01); *B32B 2451/00* (2013.01)

(56) References Cited

U.S. PATENT DOCUMENTS

| | | | | |
|---|---|---|---|---|
| 7,990,334 | B2* | 8/2011 | Maeda | H01Q 1/44 |
| | | | | 343/711 |
| 8,816,932 | B2* | 8/2014 | Kawaguchi | H01Q 1/42 |
| | | | | 235/487 |
| 8,846,194 | B2* | 9/2014 | Maruoka | C09D 5/36 |
| | | | | 428/324 |
| 9,233,650 | B2* | 1/2016 | Yoshinaga | B32B 5/16 |
| 9,493,870 | B2* | 11/2016 | Kawaguchi | B32B 27/08 |
| 9,919,493 | B2* | 3/2018 | Yamamoto | B32B 15/04 |
| 10,107,894 | B2* | 10/2018 | Cho | B60W 30/143 |
| 10,351,077 | B2* | 7/2019 | Yamada | H01Q 1/3233 |
| 10,873,129 | B2* | 12/2020 | Mayer Pujadas | H01Q 1/42 |
| 2005/0031897 | A1* | 2/2005 | Kamiya | H01Q 1/3233 |
| | | | | 428/689 |
| 2010/0207842 | A1* | 8/2010 | Kawaguchi | C23C 14/205 |
| | | | | 343/907 |
| 2011/0236672 | A1* | 9/2011 | Yanagimoto | G01S 7/032 |
| | | | | 977/773 |
| 2016/0256891 | A1* | 9/2016 | Yoshinaga | B44C 1/10 |
| 2019/0293752 | A1* | 9/2019 | Ochiai | G01S 13/93 |
| 2021/0101327 | A1* | 4/2021 | Fukushima | B29C 45/14688 |
| 2021/0194119 | A1* | 6/2021 | Yamanaka | B60R 13/005 |

FOREIGN PATENT DOCUMENTS

| | | |
|---|---|---|
| JP | 2013185869 A | 9/2013 |
| JP | 201580934 A | 4/2015 |
| WO | 2010064285 A1 | 6/2010 |
| WO | 2018010762 A1 | 1/2018 |

\* cited by examiner

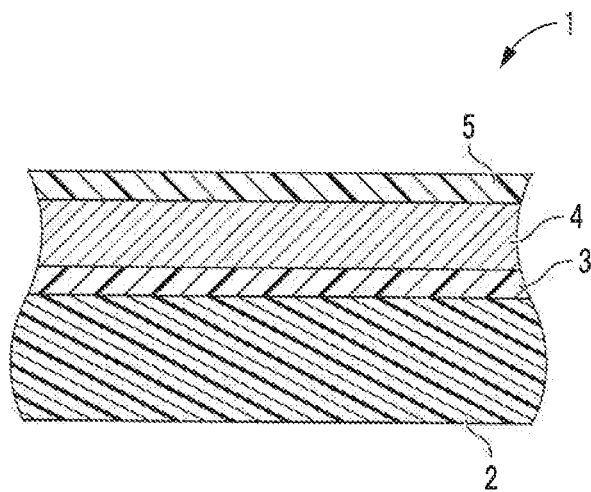

DECORATIVE MEMBER

TECHNICAL FIELD

The present invention relates to a decorative member employed for an emblem or the like indicating, for example, a vehicle manufacturing company.

BACKGROUND ART

Recently, it has been examined that a technique for measuring a distance between, for example, a forward vehicle or an obstacle and one's own vehicle, and a relative velocity for automatic driving (automatic travel) with a sensor mounted to a front of a vehicle, so as to control an inter-vehicle distance while accelerating and decelerating the own vehicle based on this measurement information. As the sensor, a radio wave transmitting and receiving device, such as a millimeter-wave radar, is typically employed.

The radio wave transmitting and receiving device, such as the millimeter-wave radar, is preferably disposed at the center position of a vehicle front portion in order to provide its performance, and for example, is often arranged behind an emblem or the like indicating, for example, a vehicle manufacturing company. In this case, after a millimeter wave, which is irradiated from the radio wave transmitting and receiving device, is radiated forward through the emblem or the like, it is reflected by, for example, the forward vehicle or the obstacle, and the radio wave transmitting and receiving device receives the reflected wave through the emblem or the like again. Therefore, the emblem is preferably made of a decorative member that has a small transmission loss of the millimeter wave, an moreover, has an excellent fine appearance due to metallic luster as its original purpose.

As the decorative member employed for the emblem or the like, there has been known one where nanoparticles of, for example, gold, silver, tin, indium, their alloys, or the like, are dispersed into a synthetic resin layer as a binding agent (for example, see Patent Document 1).

While the decorative member described in Patent Document 1 can obtain a fine appearance due to metallic luster of the nanoparticles of the metal, the millimeter wave can transmit through discontinuous portions of the nanoparticles of the metal, and thus its transmission loss is considered to be reduced.

Patent Document 1: JP-A-2013-8589 (paragraph 0007 and FIG. 5a)

DISCLOSURE OF THE INVENTION

Problems to be Solved by the Invention

However, in the decorative member where the nanoparticles of the metal axe dispersed into the synthetic resin layer, the synthetic resin impairs the metallic luster of the nanoparticles, and it is inconvenient not to obtain a sufficient fine appearance easily.

It is an objective of the present invention to provide a decorative member that eliminates such an inconvenience to reduce a transmission loss of a millimeter wave, and moreover, have an excellent metallic luster.

Solutions to the Problems

In order to achieve such objects, a decorative member of the present invention includes a base material made of a synthetic resin and a film body that is positioned on the base material and made of an agglomeration of inorganic fine particles having at least a metal surface. An attenuation rate when a millimeter wave having a frequency in a range of 1.8 to 300 GHz, preferably in a range of 18 to 100 GHz, transmits is in a range of 0.001 to 2 dB. An $L^*$ value (brightness) is in a range of 45 to 95. The decorative member of the present invention has the $L^*$ value preferably in a range of 50 to 95, and more preferably in a range of 60 to 95.

The decorative member of the present invention includes the film body including the agglomeration of the inorganic fine particles having the metal surface on the base material made of the synthetic resin. The film body is the agglomeration of the inorganic fine particles, and the inorganic fine particles do not mutually form couplings. Therefore, the millimeter wave can transit through gaps between the inorganic fine particles and can reduce its transmission loss.

Further, since the film body substantially contains only the inorganic fine particles, does not contain any synthetic resin, and the inorganic fine particle has at least a metal surface, excellent metallic luster can be obtained.

Consequently, in the decorative member of the present invention, the attenuation rate as an index of the transmission loss of the millimeter wave is in the range of 0.001 to 2 dB, and the $L^*$ value (brightness) as an index of metallic cluster is in the range of 45 to 95, preferably in the range of 50 to 95, and more preferably in the range of 60 to 95.

In the decorative member of the present invent ion, when the attenuation rate exceeds 2 dB, the transmission loss of the millimeter wave becomes large, and the millimeter wave cannot substantially transmit. Further, it is technically difficult to set the attenuation rate to less than 0.001 dB.

Further, in the decorative member of the present invention, when the $L^*$ value (brightness) is less than 40, the metallic luster cannot be obtained. Furthermore, it is technically difficult to set the $L^*$ value (brightness) to more than 95.

Further, in the decorative member of the present invention, the inorganic fine particle only needs to have at least the metal surface, for example, may include a metal coating layer on a surface of a non-metallic fine particle, such as alumina, or the inorganic fine particle itself may be made of a metal.

When the inorganic fine particle includes the metal coating layer on the surface, for example, a gold coating layer or a silver coating layer is preferably included as the coating layer in order to provide the decorative member of the present invention with a fine appearance by the metallic luster. Further, when the inorganic fine particle itself is one made of a metal, it is preferably, for example, a gold fine particle or a silver fine particle, and more preferably the silver fine particle in order to provide the decorative member of the present invention with the fine appearance by the metallic luster.

Further, in the decorative member of the present invention, the inorganic fine particles preferably have an average particle diameter in a range of 1 to 100 nm, and more preferably have the average particle diameter of 10 to 70 nm. When the decorative member of the present invention has the average particle diameter of the inorganic fine particles exceeding 100 nm, the transmission loss of the millimeter wave becomes excessive in some cases. Furthermore, it as technically difficult to set the average particle diameter of the inorganic fine particles to less than 1 nm.

Further, in the decorative member of the present invention, the film body preferably has a thickness in a range of 10 to 300 nm, and more preferably has the thickness in a range of 10 to 100 nm. When the decorative member of the present invention ha, the thickness of the film body exceeding 300 nm, the transmission loss of the millimeter wave becomes excessive in some cases. When it is less than 10 nm, sufficient metallic luster cannot be obtained in some cases.

Further, the decorative member of the present invention preferably includes a protective coating layer positioned on the film body. Since the film body substantially contains only the inorganic fine particles, and does not contain any synthetic resin, when the surface of the film body is exposed, the individual inorganic fine particles are possibly separated from the film body. However, the included protective coating layer can avoid the inorganic fine particles from being separated.

Further, the decorative member of the present invention preferably includes a base layer positioned between the base material and the film body. The decorative member of the present invention includes the base layer, and thus an adhesiveness of the film body to the base material can be improved.

BRIEF DESCRIPTION OF THE DRAWINGS

FIG. 1 is an explanatory cross-sectional view illustrating a configuration of a decorative member of the present invention.

DESCRIPTION OF PREFERRED EMBODIMENTS

Subsequently, an embodiment of the present invention will be further described in detail with reference to the attached drawing.

A decorative member 1 of this embodiment is employed, for example, for an emblem or the like disposed on a path of the millimeter wave to be transmitted and received by, for example, a radio wave transmitting and receiving device, such as a millimeter-wave radar mounted to a vehicle or the like. The decorative member 1 includes, or example, a base material 2 made of a synthetic resin, an undercoat 3 positioned on the base material 2 as a base layer, a film body 4 that is positioned on the undercoat 3 and includes an agglomeration of inorganic fine particles having at least a metal surface, and a guard coat 5 positioned on the film body 4 as a protective coating layer.

The synthetic resin constituting the base material 2 can be listed, for example: a polycarbonate resin, an acrylic resin, an epoxy resin, a polystyrene resin, a polyethylene terephthalate resin, a polyurethane resin, a polyethylene resin, a polypropylene resin, and an ABS resin.

The undercoat 3 may be anything, as long as an adhesiveness of the film body 4 to the base material 2 can be improved. For example, the undercoat 3 can include a coating material where a synthetic resin, such as a two-component urethane coating material, an epoxy coating material, a UV curable coating material, and an air-dry coating material, is used as the main agent. An example of the coating material can include a mixture at a mass ratio of 100:25:120 of a main agent (product name: EC-MM82-1003X), which is manufactured by Musashi Paint Co., Ltd., a curing agent (product name: Z-EC-H-400), and a thinner (product name: Z-EC-K785).

The film body 4 includes the agglomeration of the inorganic fine particles having at least the metal surface. An example of the inorganic fine particle can include one that includes a gold coating layer or a silver coating layer on surfaces of non-metallic fine particles, such as alumina, or one itself that is made of a metal of gold fine particles, silver fine particles, or the like. Further, the inorganic fine particles can employ ones that have an average particle diameter in a range of 1 to 100 nm, preferably in a range of 10 to 50 nm.

The film body 4 can be formed by applying an inorganic fine particle dispersion liquid produced by dispersing the inorganic fine particles into a volatile solvent over the undercoat 3 and vaporizing the volatile solvent. The inorganic fine particle dispersion liquid may be diluted using the volatile solvent as a diluent (thinner).

The volatile solvent can be listed, for example: isopropanol, methanol, ethanol, toluene, xylene, ethyl acetate, butyl acetate, methyl ethyl ketone, and cyclohexanenone, any one of the volatile solvents may be employed alone, and two or more of them may be mixed to be employed. The volatile solvent, in which the inorganic fine particles are dispersed, and the volatile solvent, which is employed as the diluent, may be the same, and may be different.

An example of the inorganic fine particle dispersion liquid can include one that contains a propylene glycol monomethyl ether as a dispersion medium and 5 mass % of the silver fine particles having the average particle diameter of 20 nm.

The film body 4 is formed as described above and thus can have a thickness in, for example, a range of 10 to 300 nm.

The guard coat 5 may be anything, as long as individual inorganic fine particles can be avoided from separating to fall from the film body 4. For example, the guard coat 5 can include a coating material where a synthetic resin, such as a two-component urethane coating material, an epoxy coating material, a UV curable coating material, and an air-dry coating material, is used as the main agent. An example of the coating material can include a mixture at a mass ratio of 100:15:80 of a main agent (product name: EC-MT62-1003X), which is manufactured by Musashi Paint Co., Ltd., a curing agent (product name: Z-EC-H-760), and the thinner (product name: Z-EC-K785).

In the decorative member 1 of this embodiment, which has the above-described configuration, an attenuation rate as an index of a transmission loss when a millimeter wave having a frequency in a range of 18 to 300 GHz transmits is in a range of 0.001 to 2 dB, and an L* value (brightness) as an index of metallic luster is in a range of 50 to 95, preferably in a range of 60 to 95.

Note that, the decorative member 1 of this embodiment is configured to include the undercoat 3 positioned between the base material 2 and the film body 4 as the base layer, and the guard coat 5 positioned on the film body 4 as the protective coating layer. However, the decorative member 1 of this embodiment may be configured not to include any one of the undercoat 3 and the guard coat 5, or both of them in some cases.

Next, examples of the present invention are described.

EXAMPLES

Example 1

In this example, first, a coating material where the main agent (product name: EC-MM82-1003X), which is manufactured by Musashi Paint Co., Ltd., the curing agent (product name: Z-EC-H-400), and the thinner (product name: Z-EC-K785) were mixed at a mass ratio of 100:25:120 was applied over the base material 2 (length of 150 mm, width of 70 mm, thickness of 3 mm) made of a polycarbonate resin, and then was baked at 100° C. for 30 minutes to form the undercoat 3 having the thickness of 20 μm.

Next, a silver fine particle dispersion liquid was applied over the undercoat 3, and then was baked at 110° for 30 minutes to form the film body 4 made of the agglomeration of the silver fine particles and have the thickness of 20 nm. The silver fine particle dispersion liquid contains a propylene glycol monomethyl ether as the dispersion medium and 5 mass % of the silver fine particles having the average particle diameter of 20 nm. Note that, the thickness of the film body 4 was measured with a transmission electron microscope.

Next, a coating material where the main agent (product name: EC-MT62-1003X), which is manufactured by Musashi Paint Co., Ltd., re curing agent (product name: Z-EC-H-760), and the thinner (product name: Z-EC-K785) were mixed at amass ratio of 100:15:80 was applied over the film body 4, and then was baked at 100° C. for 30 minutes to form the guard coat having the thickness of 20 μm, so as to obtain the decorative member 1.

Next, in the decorative member 1 obtained in this example, the attenuation rate as the index of the transmission loss when the millimeter wave transmits, and the L* value (brightness) as the index of metallic luster were measured.

The attenuation rate was measured with respect to the millimeter wave having a frequency band of 18 to 26.5 and 70 to 90 GHz by a transmission attenuation rate measuring device (product name: Vector Network Analyzer N5227A) manufactured by KEYCOM Corporation while installing the guard coat of the decorative member of this example using a transmission attenuation rate measuring tool with a dielectric lens manufactured by KEYCOM Corporation such that the guard coat was disposed to face a transmitting side of the device. The results are illustrated in Table 1.

Further, the L* value (brightness) was measured from a side of the base material 2 made of a polycarbonate resin by using a spectrophotometer (product name: CM-600d) manufactured by KONICA MINOLTA, INC. as an L* value (brightness) in an SCI method, where regular reflection lights were included, using a D65 light source. The results are illustrated in Table 1.

Example 2

In this example, the decorative member 1 was obtained in exactly the sane manner as Example 1 except that the silver fine particles had the average particle diameter of 13 nm, and the thickness of the film body 4 was 50 nm. Next, for the decorative member obtained in this example, the attenuation rate as the index of the transmission loss when the millimeter wave transmits, and the L* value (brightness) as the index of metallic luster were measured in exactly the same manner as Example 1. The results are illustrated in Table 1.

Example 3

In this example, the decorative member 1 was obtained in exactly the same manner as Example 1 except that the silver fine particles had the average particle diameter of 70 nm, and the thickness of the film body 4 was 50 nm. Next, for the decorative member obtained in this example, the attenuation rate as the index of the transmission loss when the millimeter wave transmits, and the L* value (brightness) as the index of metallic luster were measured in exactly the same manner as Example 1. The results are illustrated in Table 1.

Example 4

In this example, the decorative member 1 was obtained in exactly the same manner as Example 1 except that the thickness of the film body 4 was 50 nm. Next, for the decorative member 1 obtained in this example, the attenuation rate as the index of the transmission loss when the millimeter wave transmits, and the L* value (brightness) as the index of metallic luster were measured in exactly the same manner as Example 1. The results are illustrated in Table 1.

Example 5

In this example, the decorative member 1 was obtained in exactly the same manner as Example 1 except that the thickness of the film body was 100 nm. Next, for the decorative member 1 obtained in this example, the attenuation rate as the index of the transmission loss when the millimeter wave transmits, and the L* value (brightness) as the index of metallic luster were measured in exactly the same manner as Example 1. The results are illustrated in Table 1.

Example 6

In this example, the decorative member 1 was obtained in exactly the same manner as Example 1 except that the thickness of the film body 4 was 150 nm. Next, for the decorative member obtained in this example, the attenuation rate as the index of the transmission loss when the millimeter wave transmits, and the L* value (brightness) as the index of metallic luster were measured in exactly the same manner as Example 1. The results are illustrated in Table 1.

Example 7

In this example, the decorative member 1 was obtained in exactly the same manner as Example 1 except that the silver fine particles had the average particle diameter of 30 nm, and the thickness of the film body 4 was 300 nm. Next, for the decorative member obtained in this example, the attenuation rate as the index of the transmission loss when the millimeter wave transmits, and the L* value (brightness) as the index of metallic luster were measured in exactly the same manner as Example 1. The results are illustrated in Table 1.

Example 8

In this example, the decorative member 1 was obtained in exactly the same manner as Example 1 except that the undercoat 3 and the guard coat 5 were not formed at all, and the thickness of the film body 4 was 50 nm. Next, for the decorative member obtained in this example, the attenuation rate as the index of the transmission loss when the millimeter wave transmits, and the L* value (brightness) as the index of metallic luster were measured in exactly the same manner as Example 1. The results are illustrated in Table 1.

Example 9

In this example, the decorative member 1 was obtained in exactly the same manner as Example 8 except that the silver fine particles had the average particle diameter of 30 nm, and the thickness of the film body 4 was 10 nm. Next, for the decorative member obtained in this example, the attenuation rate as the index of the transmission loss when the millimeter wave transmits, and the L* value (brightness) as the index of metallic luster were measured in exactly the same manner as Example 1. The results are illustrated in Table 1.

Example 10

In this example, first, instead of the silver fine particle dispersion liquid of Example 1, a gold fine particle dispersion liquid that contains a propylene glycol monomethyl ether as the dispersion medium and 10 mass % of the gold fine particles having the average particle diameter of 30 nm was prepared. Next, the gold fine particle dispersion liquid was diluted with toluene to prepare a gold fine particle dispersion liquid that contains 2.5 mass % of the gold fine particle having the average particle diameter of 30 nm.

Next, the decorative member 1 was obtained in exactly the same manner as Example 1 except that the film body 4 that was made of the agglomeration of the gold fine particles and had the thickness of 20 nm was formed using the gold fine particle dispersion liquid containing 2.5 mass % of the gold fine particles having the average particle diameter of 30 nm, which was obtained in this example. Subsequently, in the decorative member obtained in this comparative example, the attenuation rate as the index of the transmission loss when the millimeter wave transmits, and the L* value (brightness) as the index of metallic luster were measured in exactly the same manner as Example 1. The results are illustrated in Table 2.

Comparative Example 1

In this comparative example, the decorative member 1 was obtained in exactly the same manner as Example 1 except that the undercoat 3 was not formed, and a synthetic resin layer that was made of an acrylic urethane resin and had a thickness of 50 nm was formed instead of the film body 4. The synthetic resin layer was made of the acrylic urethane resin where the main agent (product name: EC-MM82-1003X), which is manufactured by Musashi Paint Co., Ltd., and the curing agent (product name: Z-EC-H-400), were mixed at a mass ratio of 100:10, and contained 2.4 g of the silver fine particles having the average particle diameter of 20 nm per 1 gram.

Next, in the decorative member 1 obtained in this comparative example, the attenuation rate as the index of the transmission loss when the millimeter wave transmits, and the L* value (brightness) as the index of metallic luster were measured in exactly the same manner as Example 1 The results are illustrated in Table 3.

Comparative Example 2

In this comparative example, the decorative member was obtained in exactly the same manner as Example 1 except that the silver coating layer having a thickness of 100 nm was formed instead of the film body 4. Unlike the film body 4, which was made of the agglomeration of the silver fine particles of Examples 1 to 4, the silver coating layer was in a state where the silver fine particles were mutually coupled to be continuous by applying a silver fine particle dispersion liquid (the average particle diameter of the silver fine particles is 10 nm) manufactured by Musashi Paint Co., Ltd. over the undercoat 3, and then baking it at 100° C. for 30 minutes.

The silver fine particle dispersion liquid, which is manufactured by Musashi Paint Co., Ltd., was a mixture at a weight ratio of 100:200 of EC MIRROR AGENT AG IKY M/C AG (product name) and MPC thinner (product name, which is manufactured by Musashi Paint Co., Ltd. Next, in the decorative member 1 obtained in this comparative example, the attenuation rate as the index of the transmission loss when the millimeter wave transmits, and the L* value (brightness) as the index of metallic luster were measured in exactly the same manner as Example 1. The results are illustrated in Table 3.

TABLE 1

| | | EXAMPLE | | | | |
|---|---|---|---|---|---|---|
| | | 1 | 2 | 3 | 4 | 5 |
| UNDERCOAT THICKNESS (μm) | | 20 | 20 | 20 | 20 | 20 |
| FILM BODY THICKNESS (nm) | | 20 | 50 | 50 | 50 | 100 |
| AVERAGE PARTICLE DIAMETER OF SILVER FINE PARTICLES (nm) | | 20 | 13 | 70 | 20 | 20 |
| GUARD COAT THICKNESS (μm) | | 20 | 20 | 20 | 20 | 20 |
| ATTENUATION RATE OF MILLIMETER WAVE (dB) | 18 GHz | 1.03 | 1.05 | 1.08 | 1.03 | 1.02 |
| | 24 GHz | 0.53 | 0.85 | 1.12 | 0.47 | 0.43 |
| | 26.5 GHz | 0.26 | 0.64 | 0.99 | 0.21 | 0.18 |
| | 70 GHz | 0.86 | 0.29 | 1.62 | 1 | 1.12 |
| | 76.5 GHz | 1.28 | 0.6 | 1.52 | 1.25 | 1.21 |
| | 90 GHz | 0.44 | 1.35 | 0.42 | 0.39 | 0.44 |
| L* VALUE (BRIGHTNESS) | | 70 | 62 | 58 | 71 | 74 |

TABLE 2

| | | EXAMPLE | | | | |
|---|---|---|---|---|---|---|
| | | 6 | 7 | 8 | 9 | 10 |
| UNDERCOAT THICKNESS (μm) | | 20 | 20 | — | — | 20 |
| FILM BODY THICKNESS (nm) | | 150 | 300 | 50 | 10 | 20 |
| AVERAGE PARTICLE DIAMETER OF SILVER (GOLD) FINE PARTICLES (nm) | | 20 | 30 | 20 | 30 | 30 |
| GUARD COAT THICKNESS (μm) | | 20 | 20 | — | — | 20 |
| ATTENU-ATION RATE OF MILLI-METER WAVE (dB) | 18 GHz | 1.05 | 1.06 | 1.00 | 1.10 | 1.91 |
| | 24 GHz | 0.86 | 0.87 | 0.42 | 1.10 | 1.47 |
| | 26.5 GHz | 0.65 | 0.66 | 0.18 | 0.96 | 1.21 |
| | 70 GHz | 0.25 | −0.32 | 1.16 | 1.28 | 1.42 |
| | 76.5 GHz | 0.44 | −0.47 | 1.12 | 0.91 | 1.49 |
| | 90 GHz | 1.32 | −1.27 | 0.44 | 0.26 | 0.60 |
| L* VALUE (BRIGHTNESS) | | 73 | 74 | 83 | 52 | 47 |

TABLE 3

| | | COMPARATIVE EXAMPLE | |
|---|---|---|---|
| | | 1 | 2 |
| UNDERCOAT THICKNESS (μm) | | — | 20 |
| THICKNESS OF SYNTHETIC RESIN LAYER OR SILVER COATING LAYER (nm) | | 50 | 100 |
| AVERAGE PARTICLE DIAMETER OF SILVER FINE PARTICLES (nm) | | 20 | 10 |
| GUARD COAT THICKNESS (μm) | | 20 | 20 |
| ATTENUATION RATE OF MILLIMETER WAVE (dB) | 18 GHz | 1.10 | 27.30 |
| | 24 GHZ | 1.12 | 29.50 |
| | 26.5 GHz | 1.10 | 30.60 |
| | 70 GHz | 1.20 | 28.91 |
| | 76.5 GHz | 1.05 | 26.89 |
| | 90 GHz | 0.27 | 30.61 |
| L* VALUE (BRIGHTNESS) | | 43 | 66 |

From Tables 1 to 3, it is apparent that, compared with the decorative member 1 of Comparative Example 1, the decorative members 1 of Examples 1 to 10 have similar attenuation rates as the index of the transmission loss when the millimeter wave transmits, and large L* values (brightness) as the index of metallic luster.

Further, it is apparent that the decorative members 1 of Examples 1 to 10 have the L* values (brightness) of 45 or more as the index of metallic luster, and small attenuation rates as the index of the transmission loss when the millimeter wave transmits compared with the decorative member 1 of Comparative Example 2.

Therefore, it is apparent that the decorative members of Examples 1 to 10 have small transmission losses of the millimeter wave, and moreover, excellent metallic luster.

Furthermore, it is apparent that while the decorative members 1 of Examples 1 to 9, which include the film body 4 made of the agglomeration of the silver fine particles, have the L* values (brightness) of 50 or more as the index of metallic luster, the decorative member 1 of Example 10, which includes the film body 4 made of the agglomeration of the gold fine particles, has the L* value (brightness) of 47 as the index of metallic luster, and it is apparent that the film body 4 made of the agglomeration of the silver fine particles ensures obtaining the L* value larger than that of the case of being made of the agglomeration of the gold fine particles.

The invention claimed is:

1. A decorative member comprising:
    a base material made of a synthetic resin; and
    a film body that is positioned on the base material,
    wherein the film body contains only an agglomeration of only inorganic fine particles having at least a metal surface, and does not contain any synthetic resin, and
    wherein an attenuation rate when a millimeter wave having a frequency in a range of 18 GHz to 300 GHz transmits is in a range of 0.001 dB to 2 dB, and an L* value (brightness) is in a range of 45 to 95.

2. The decorative member according to claim 1, wherein the attenuation rate is an attenuation rate when a millimeter wave having a frequency in a range of 18 GHz to 100 GHz transmits.

3. The decorative member according to claim 1, wherein the L* value (brightness) is in a range of 50 to 95.

4. The decorative member according to claim 1, wherein the L* value (brightness) is in a range of 60 to 95.

5. The decorative member according to claim 1, wherein the inorganic fine particle has a surface including a gold coating layer or a silver coating layer.

6. The decorative member according to claim 1, wherein the inorganic fine particle is a gold fine particle or a silver fine particle.

7. The decorative member according to claim 1, wherein the inorganic fine particles have an average particle diameter in a range of 1 nm to 100 nm.

8. The decorative member according to claim 7, wherein the inorganic fine particles have an average particle diameter in a range of 10 nm to 70 nm.

9. The decorative member according to claim 1, wherein the film body has a thickness in a range of 10 nm to 300 nm.

10. The decorative member according to claim 1, further comprising a protective coating layer positioned on the film body.

11. The decorative member according to claim 1, further comprising a base layer positioned between the base material and the film body.

* * * * *